US011860781B1

(12) United States Patent
Raz et al.

(10) Patent No.: US 11,860,781 B1
(45) Date of Patent: Jan. 2, 2024

(54) CLEAN ENGINE FOR WRITE-BACK CACHE MEMORY

(71) Applicant: Amazon Technologies, Inc., Seattle, WA (US)

(72) Inventors: Moshe Raz, Pardesiya (IL); Guy Nakibly, Kedumim (IL); Gal Avisar, Giv'Atayim (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/662,062

(22) Filed: May 4, 2022

(51) Int. Cl.
*G06F 12/00* (2006.01)
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0655* (2013.01); *G06F 3/0673* (2013.01); *G06F 2212/60* (2013.01)

(58) Field of Classification Search
None
See application file for complete search history.

(56) References Cited

U.S. PATENT DOCUMENTS

2019/0129849 A1\* 5/2019 Avrukin ................ G06F 12/084
2020/0341686 A1\* 10/2020 Lee ........................ G06F 3/0655

\* cited by examiner

*Primary Examiner* — Daniel D Tsui
(74) *Attorney, Agent, or Firm* — Weaver Austin Villeneuve & Sampson LLP

(57) ABSTRACT

A write cleaner circuit can be used to implement write-through (WT) functionality by a write-back (WB) cache memory for updating the system memory. The write cleaner circuit can intercept memory write transactions issued to the WB cache memory and generate clean requests that can enable the WB cache memory to send update requests to corresponding memory locations in the system memory around the same time as the memory write transactions are performed by the WB cache memory, and clear dirty bits in the cache lines corresponding to those memory write transactions.

20 Claims, 7 Drawing Sheets

CLEAN ENGINE FOR WRITE-BACK CACHE MEMORY

BACKGROUND

In computer systems, cache memories can be used to improve system performance for accesses to a system memory. A cache memory can be a write-back (WB) cache or a write-through (WT) cache based on the cache update policy supported by the memory. In a WB cache memory, a memory transaction only updates the cache and marks the allocated cache line dirty. The system memory is updated when the dirty cache line is evicted from the WB cache memory. In a WT cache memory, a write transaction updates both the cache memory and the system memory, and the cache line is not marked dirty.

BRIEF DESCRIPTION OF THE DRAWINGS

Various embodiments in accordance with the present disclosure will be described with reference to the drawings, in which.

DETAILED DESCRIPTION

Figure 1:
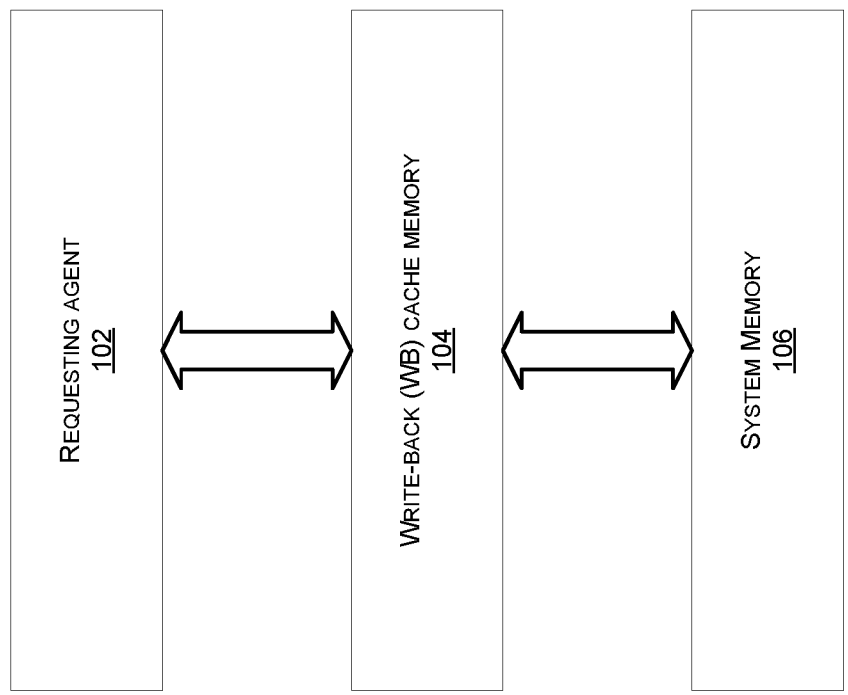
FIG. 1 illustrates a computing system comprising a requesting agent, a write-back (WB) cache memory, and a system memory.

A computing system may include processor cores, memory devices, input/output (I/O) devices, accelerators, graphics processing units (GPUs), digital signal processors (DSPs), crypto engines, direct memory access (DMA) engines, and other components that may communicate with one another via one or more interconnect fabrics. The computing system may include a system memory which may be implemented using memory modules comprising DRAMs, SDRAMs, DDRs, SSDs, or other suitable memory devices. The computing system may also include multiple levels of cache memories. Generally, each processor core may include one or more integrated lower-level caches (e.g., Level 1 and Level 2), and a system level cache (e.g., SLC) may be shared by different agents. The agents can be the processor cores, DMA controllers, GPUs, DSPs, or other devices that have access to the system memory. In some implementations, the SLC can be part of an interconnect fabric that is communicatively coupled to all the agents, and may also be called a fabric cache. The SLC can be a higher-level cache, e.g., a Level 3 (L3) cache, or a Level 4 (L4) cache based on the implementation. The SLC can be a direct mapped cache, a set-associative cache, or a fully associative cache.

When a memory transaction (e.g., a write transaction or a read transaction) is issued by a requesting agent to access a memory location, the SLC can be checked to determine whether a corresponding entry exists in the SLC (e.g., after a cache-miss on the lower-level caches). If the corresponding entry does not exist in the SLC, a cache line can be allocated to load the contents of the memory location from the system memory to the SLC. When another requesting agent issues a memory write transaction to access the same memory location at a later point in time, the memory write transaction can be performed on the cache line at the corresponding memory location in the SLC instead of accessing the system memory. However, the memory write transaction can cause incoherency between the contents of the SLC and the system memory for that memory location.

In some implementations, a write back (WB) or a write through (WT) policy can be used to ensure that the contents of a memory location in the system memory and the SLC are coherent. When the SLC is a WT cache, the data for a memory write transaction is written to the SLC as well as to the system memory when the write transaction is issued. When the SLC is a WB cache, the data for the memory write transaction is written in the cache line corresponding to the memory location, and a dirty bit of the cache line can be set to indicate that the contents of the SLC and the system memory are not coherent for that memory location. At a later point in time, when the cache line with the dirty bit is evicted to make room for another cache line, the contents of the dirty cache line are copied to the system memory.

In some implementations, the system memory (e.g., DRAM) may utilize a page buffer to execute the read or write memory transactions. The page buffer may also be called a row buffer, or a working buffer, and is used to temporarily store a memory page being accessed from the system memory. For example, upon receiving a transaction, the system memory may read a memory page corresponding to a transaction address into the page buffer, perform a read or write of the memory location corresponding to the transaction address, and write the memory page back into the system memory. Each memory page may include multiple memory locations based on the implementation of the system memory.

In some implementations, the system memory may include multiple DRAM arrays. Each DRAM array may include a page buffer, which can hold a page or a row of the DRAM array at a time. Each memory access may include opening or downloading a page to perform the write or read operation, and writing the page back to the DRAM array. Writing the page to the DRAM array may include a pre-charging operation which may include closing the page in the page buffer, uploading the page back to the DRAM array, and preparing the DRAM array for fetching the next page. Opening and closing a memory page can incur a much higher latency than accessing the data from the page buffer. Thus, when multiple transactions are performed, a higher memory bandwidth can be achieved by accessing locations within a memory page that is opened as compared to accessing different memory pages. In some implementations, the DRAM arrays can be part of a DRAM bank, and multiple such DRAM banks can correspond to a rank. In some systems, the system memory may include dual in-line memory modules (DIMMs) comprising multiple such ranks.

Some computing systems may use an SLC to cache data frequently accessed by the components of the computing system. The SLC can be provided by a third-party vendor as an intellectual property (IP) block, and thus it may not be possible to modify certain features of the SLC such as the cache update policy. For example, if the SLC is designed as a WB cache, the SLC may not have native support to perform write-through operations. Thus, when a memory write transaction is performed by the SLC, the status of a cache line corresponding to the transaction address can be updated from clean to dirty. When this dirty cache line is evicted, the contents of the cache line can be written back to the DRAM. When memory write transactions with sequential addresses are issued, the SLC may be written serially, and the status of each cache line corresponding to the sequential addresses can be updated to dirty. However, the cache lines with the dirty status may be evicted in a random order, which may cause corresponding memory locations in the DRAM to be updated in the random order. Updating the memory locations in the DRAM in the random order may cause different pages corresponding to the different memory locations to be opened and closed. Thus, updating the memory locations in the DRAM in a random order may trigger multiple pre-charging events which can be very costly in terms of power consumption and latency, and can adversely affect the DRAM performance.

The technique described herein can be used to improve the utilization and performance of the system memory using a clean engine when the SLC is a WB cache. The clean engine may include a write cleaner circuit coupled to the interconnect fabric in between a requesting agent and the SLC. The write cleaner circuit can be used to cause a system memory to be updated around the same time as the SLC is written for certain memory write transactions. Thus, some embodiments can allow implementing the write-through functionality with an SLC that is a WB cache. For example, instead of waiting for the SLC to evict a cache line and update the corresponding system memory location when the cache is full, the write cleaner can cause an explicit clean of the cache line corresponding to the memory location which updates the status of the cache line from dirty to clean, and updates the system memory location around the same time of the write transaction. The cache line can be evicted silently at a later point in time, without needing to update the corresponding system memory location at the time of the eviction.

In some embodiments, the write cleaner circuit can be used to efficiently perform updates to the DRAM for memory write transactions with sequential addresses, which can improve the utilization and performance of the DRAM. For example, the sequential addresses may be mapped to the same memory page (or row) in the DRAM, which can allow a single update of the DRAM from the page buffer for those memory write transactions. In some embodiments, the write cleaner circuit may identify memory write transactions having sequential addresses that have been issued to access memory locations corresponding to a memory page in the DRAM, and generate respective clean requests with the same address and cache attributes as the corresponding memory write transaction.

The SLC may receive the respective clean requests and update the status of each cache line corresponding to the respective memory location from dirty to clean. The SLC may send update requests to the DRAM based on the clean requests. The DRAM may download the contents of the memory page corresponding to the sequential addresses to the page buffer based on the update requests and update the contents of the memory page based on the corresponding memory locations in the SLC. The DRAM can perform a single upload of the updated memory page from the page buffer to the DRAM for the memory write transactions with the sequential addresses instead of performing multiple DRAM updates at random times, which can drastically improve the DRAM utilization and performance by minimizing the pre-charging of the corresponding DRAM cells.

In some embodiments, the requesting agents can mark each memory write transaction having a sequential address within a time period so that the write cleaner circuit can identify the transactions having sequential addresses and generate corresponding clean requests. In other embodiments, the write cleaner circuit can compare the address of each memory write transaction with a sequential address range to identify the memory write transactions that have the sequential addresses.

In some implementations, the WB SLC can be a distributed cache comprising a set of SLC blocks. In various embodiments, different functionalities of the clean engine can be distributed along the data path between the requesting agents and the distributed WB SLC. For example, the decision logic for determining whether a clean request is to be generated for a memory write transaction can be separate from the clean request generation circuitry of the write cleaner. In such implementations, the component making the decision can provide an indication in the write request to instruct the write cleaner to generate a clean request. In some embodiments, each requesting agent can be associated with its own respective decision logic for determining whether a clean request is to be generated for a memory write transaction. The decision logic can be integrated as part of the requesting agent, or be coupled to the requesting agent along the datapath to the WB SLC. In some embodiments, each block of the distributed WB SLC can be coupled to a respective clean request generation circuitry of the write cleaner for generating a respective clean request.

Thus, some embodiments can be used to optimize the performance of the system memory in a computer system having a WB SLC by implementing write-through functionality for multiple write transactions to memory locations in a memory page. The techniques described herein can be used with bus protocols such as Advanced Microcontroller Bus Architecture (AMBA) Advanced eXtensible Interface (AXI) Coherency Extensions (ACE), Coherent Hub Interface (CHI), or Compute Express Link (CXL), among others.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a computing system 100 comprising a requesting agent 102, a write-back (WB) cache memory 104, and a system memory 106. Note that the WB cache memory 104 may also be coupled to additional requesting agents which are not shown in FIG. 1 for ease of discussion. In some examples, the computing system 100 may be configured to support applications such as artificial intelligence (AI), cloud computing, web hosting, gaming, networking, or high-performance computing (HPC), among others.

The requesting agent 102 may include a processor, a DMA controller, a DSP, a GPU, a co-processor, or other integrated circuits which may be configured to issue memory transactions. In some implementations, the processor may include one or more lower level of integrated caches (e.g., L1 and L2), and the WB cache memory 104 can be a higher-level cache (e.g., L3 cache). The requesting agent 102, the WB cache memory 104, and the system memory 106 may communicate with one another via an interconnect fabric based on any suitable protocol such as ACE, CHI, or CXL. In some implementations, the WB cache memory 104 can be a system level cache (SLC), which may be used to maintain coherency among multiple processors coupled to a coherent interconnect fabric, and may also be called a fabric cache. The WB cache memory 104 can be a direct mapped cache, a set-associative cache, or a fully associative cache.

Figure 2:
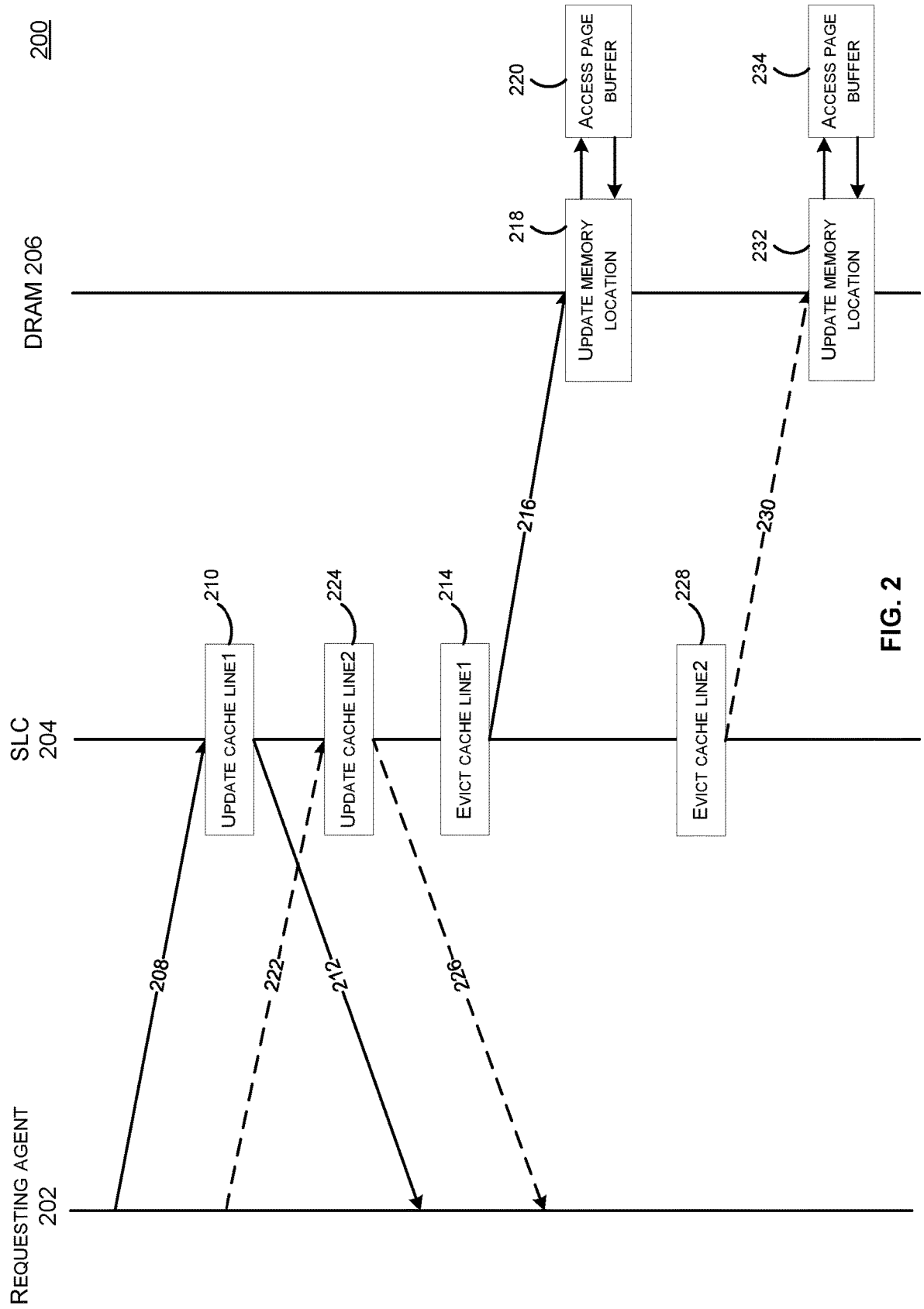
FIG. 2 illustrates a communication diagram to show the interactions among different components of a computing system to perform memory write transactions having sequential addresses.

FIG. 2 illustrates a communication diagram 200 to show the interactions among different components of a computing system to perform memory write transactions having sequential addresses. The computing system may include a requesting agent 202, an SLC 204, and a DRAM 206. For example, the requesting agent 202 can be an example of the requesting agent 102, the SLC 204 can be an example of the WB cache memory 104, and the DRAM 206 can be an example of the system memory 106 of the computing system 100 in FIG. 1.

In step 208, the requesting agent 202 may issue a first memory write transaction to write data into a first memory location corresponding to a transaction address. The first memory write transaction may be received by the SLC 204. In step 210, the SLC 204 may update a cache line1 corresponding to the first memory location by writing the data for the first memory write transaction and changing the status of the cache line1 to dirty. In some cases, the cache line1 may have been allocated for the transaction address prior to the first memory write transaction. In step 212, the SLC 204 may send a response to the requesting agent 202 indicating completion of the first memory write transaction.

In step 214, at a later point in time the cache line1 may be evicted when a new cache line is allocated in the SLC 204 for another transaction. Since the status of the cache line1 indicates dirty, the SLC 204 may send a first update request to the DRAM 206 in step 216 to copy the contents of the cache line1 to the first memory location in the DRAM 206.

In step 218, the DRAM 206 may receive the first update request to update the first memory location. In step 220, the DRAM 206 may access a page buffer to perform the first memory write operation. For example, the DRAM 206 may download a memory page from the memory array corresponding to the first memory location into the page buffer, update the first memory location based on the contents of the cache line1, and upload the memory page back to the memory array in the DRAM 206.

In some instances, memory write transactions with sequential addresses may be issued within a certain time period by one or more requesting agents. For example, in step 222, the requesting agent 202 may issue a second memory write transaction having an address that is sequential to the first memory write transaction. In step 224, the SLC 204 may update a cache line2 corresponding to the second memory location by writing the data for the second memory write transaction and changing the status of the cache line2 to dirty. In some cases, the cache line2 may have been allocated prior to the second memory write transaction. In step 226, the SLC 204 may send a response to the requesting agent 202 indicating completion of the second memory write transaction.

In step 228, at a later point in time the cache line2 may be evicted when a new cache line is allocated in the SLC 204 for another transaction. Since the status of the cache line2 indicates dirty, the SLC 204 may send a second update request to the DRAM 206 in step 230 to copy the contents of the cache line2 to the second memory location in the DRAM 206.

In step 232, the DRAM 206 may receive the second update request to update the second memory location. In step 234, the DRAM 206 may access the page buffer again to perform the second memory write operation. For example, the DRAM 206 may download the memory page from the memory array again corresponding to the second memory location into the page buffer, update the second memory location based on the contents of the cache line2, and upload the memory page back to the memory array in the DRAM 206.

In some examples, the cache line1 and the cache line2 may be updated in a sequential order for the memory write transactions having sequential addresses; however, the cache line1 and the cache line2 may be evicted at random times. For example, other cache lines may be evicted in between the eviction of the cache line1 and the cache line2 as a result of other memory transactions that access the SLC 204. In such cases, the memory locations in the DRAM 206 may be updated at random times based on the timing of the corresponding cache line evictions. Due to the eviction of other unrelated cache lines, the corresponding memory locations may need to be updated in the DRAM 206, and the DRAM 206 may have to download and upload other memory pages in the page buffer that do not correspond to the memory locations for the sequential addresses. For example, the DRAM 206 may download and upload a first memory page corresponding to the first memory location for the first memory write transaction for step 218. Next, the DRAM 206 may download and upload a second memory page corresponding to a third memory location for a third memory write transaction without the sequential address. Next, the DRAM 206 may download and upload the first memory page again for the second memory write transaction for step 232. As discussed previously, uploading of each memory page can be costly and adversely impact the performance of the DRAM 206.

Figure 3:
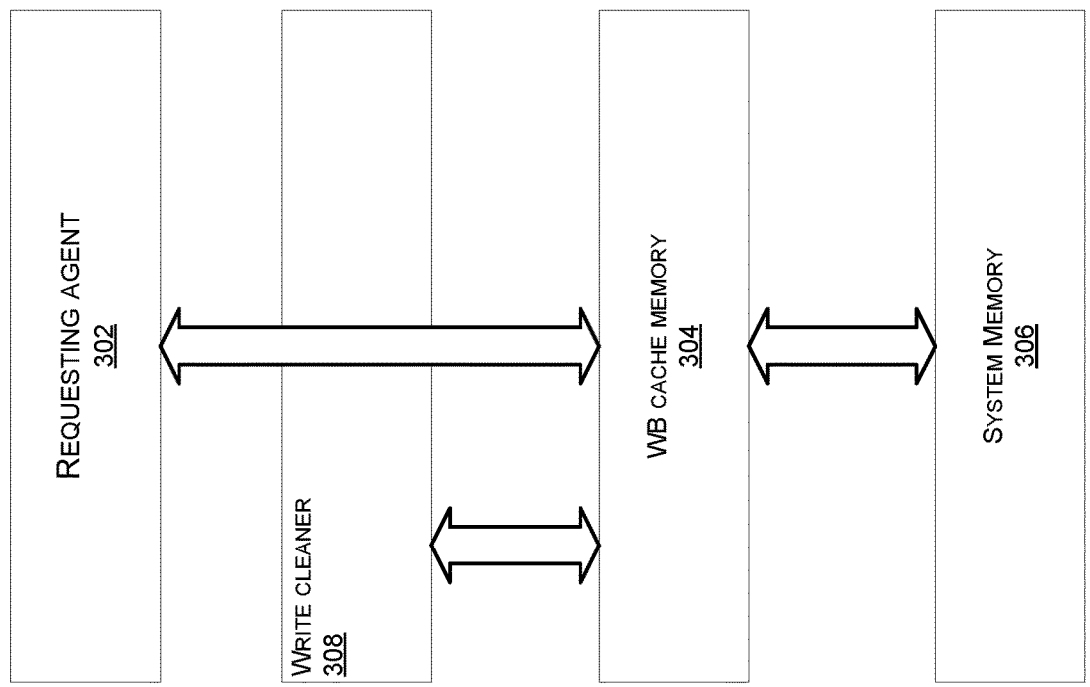
FIG. 3 illustrates a computing system comprising a write cleaner circuit that can be used to enable write-through functionality for updating the system memory, according to some embodiments.

FIG. 3 illustrates a computing system 300 comprising a write cleaner circuit that can be used to provide write-through functionality for updating a system memory, according to some embodiments. The computing system 300 may include a requesting agent 302, a WB cache memory 304, a system memory 306, and a write cleaner 308. Note that the computing system 300 may include other components which are not shown here for ease of discussion. The requesting agent 302 can be similar to the requesting agent 102, the WB cache memory 304 can be similar to the WB cache memory 104, and the system memory 306 can be similar to the system memory 106 discussed with reference to FIG. 1. In various implementations, the WB cache memory 304 can be a direct mapped cache, an N-way (e.g., N can be 2, 4, or higher) set-associative cache, or a fully associative cache. In some embodiments, the write cleaner 308 can be an integrated circuit that is a distinct component or part of another component in the computing system 300. In some embodiments, different functionalities of the write cleaner 308 can be split up as distinct components or integrated with other components of the computing system 300.

In some embodiments, the write cleaner 308 can be coupled to the WB cache memory 304 and the requesting agent 302 via an interconnect fabric. The write cleaner 308 may also be coupled to other requesting agents (not shown) via the interconnect fabric. The write cleaner 308 may be configured to determine that a memory write transaction from the requesting agent 302 to access a memory location in the system memory 306 triggers a clean request. For example, the requesting agent 302 may mark a memory write transaction to indicate that a clean request is to be generated if the memory write transaction is part of a set of memory write transactions having sequential addresses. The write cleaner 308 may determine that the clean request is to be generated based on the indication in the memory write transaction. In some implementations, the write cleaner 308 may determine that the clean request is to be generated based on a comparison of the transaction address with an address range, e.g., to determine whether the transaction address lies within the address range for sequential addresses.

The write cleaner 308 may also be configured to generate a clean request to the WB cache memory 304 based on the memory write transaction. The clean request may include the address and cache attributes of the memory write transaction issued by the requesting agent 302 to have the WB cache memory 304 perform an explicit clean of a cache line corresponding to the memory location. The WB cache memory 304 may update the status of the cache line from dirty to clean based on the clean request, and update the memory location in the system memory 306.

In some embodiments, functionality of the write cleaner 308 may be distributed along the data path between the requesting agents and the WB cache memory 304. For example, the decision logic that determines whether a clean request is to be generated can be separate from the clean request generation circuitry of the write cleaner 308. In some embodiments, the decision logic to determine whether a clean request is to be generated for a memory write transaction issued by a requesting agent can be part of that requesting agent. Furthermore, the clean request generation circuitry that is configured to generate a clean request to the WB cache memory 304 based on the memory write transaction can be coupled to the interconnect fabric along the datapath before the WB cache memory 304. In some embodiments, the WB cache memory 304 can be a distributed cache comprising multiple SLC blocks. Each SLC block may be coupled to a respective clean request generation circuitry, which is coupled to the interconnect fabric.

In some examples, a stream of memory write transactions corresponding to a long memory write transaction (e.g., a transaction with a large data transfer size) may be mapped to multiple caches lines in the SLC cache. For example, each cache line may be part of a respective SLC block which can be accessed using the same transaction identifier associated with the long memory write transaction. A long memory write transaction can be identified based on a comparison of the transaction size with a threshold. The requesting agent issuing a long memory write transaction may be aware that this memory write transaction will be performed on multiple cache lines in a set corresponding to multiple memory locations in the same memory page, and may only mark the last write transaction in that set to be cleaned (e.g., clear the corresponding dirty bit). The generation circuitry of the write cleaner 308 coupled to the SLC block with the last cache line may generate the clean request, which may cause a simultaneous update of the memory locations of the memory page in the system memory 306 based on updated data of the stream of memory write transactions for the long memory write, even though only one clean request was generated.

In some embodiments, each requesting agent may include or be coupled to a respective decision circuitry for indicating whether a clean request is to be generated for a corresponding memory write transaction. The decision circuitry may be configured to determine whether a clean request is to be generated for a memory write transaction based on a comparison of the transaction address with a set of sequential addresses, or a comparison of the transaction size with the threshold for a long transaction. The memory write transaction may be received by the interconnect fabric via a port coupled to another fabric that is configured to arbitrate among a set of requesting agents for transmitting the memory write transactions.

In some implementations, the computing system 300 may include multiple such ports coupled to the interconnect fabric, and each port may be fed by a corresponding smaller fabric configured to arbitrate among a corresponding set of requesting agents. In some embodiments, each of these ports can be coupled to the interconnect fabric via a respective decision circuitry implemented as a distinct component. For example, in such cases, the decision circuitry may be configured to determine whether a clean request is to be generated for a memory write transaction based on a comparison of the transaction address with a set of sequential addresses, or a comparison of the transaction size with the threshold, and provide an indication in the memory write transaction based on this determination. In some implementations, AXI USER bit(s) can be used to provide the indication corresponding to the memory write transaction.

In some embodiments, the decision circuitry can be configured to determine whether a clean request is to be generated only for specific ports by comparing the transaction address with an address range associated with each of those ports. For example, certain ports of the interconnect fabric may be coupled to other integrated circuit devices (e.g., a host processor or a data buffer), which may rely on explicit cache clean operations for specific transactions.

Thus, instead of waiting for the eviction of the cache line by the WB cache memory 304 to update the memory location in the system memory 306, the write cleaner 308 can force the update of the memory location in the system memory 306 around the same time as the update of the cache line in the WB cache memory 304 is performed. Forcing the system memory update using the write cleaner 308 can provide more benefits for memory transactions having sequential addresses, as discussed with reference to FIG. 4.

Figure 4:
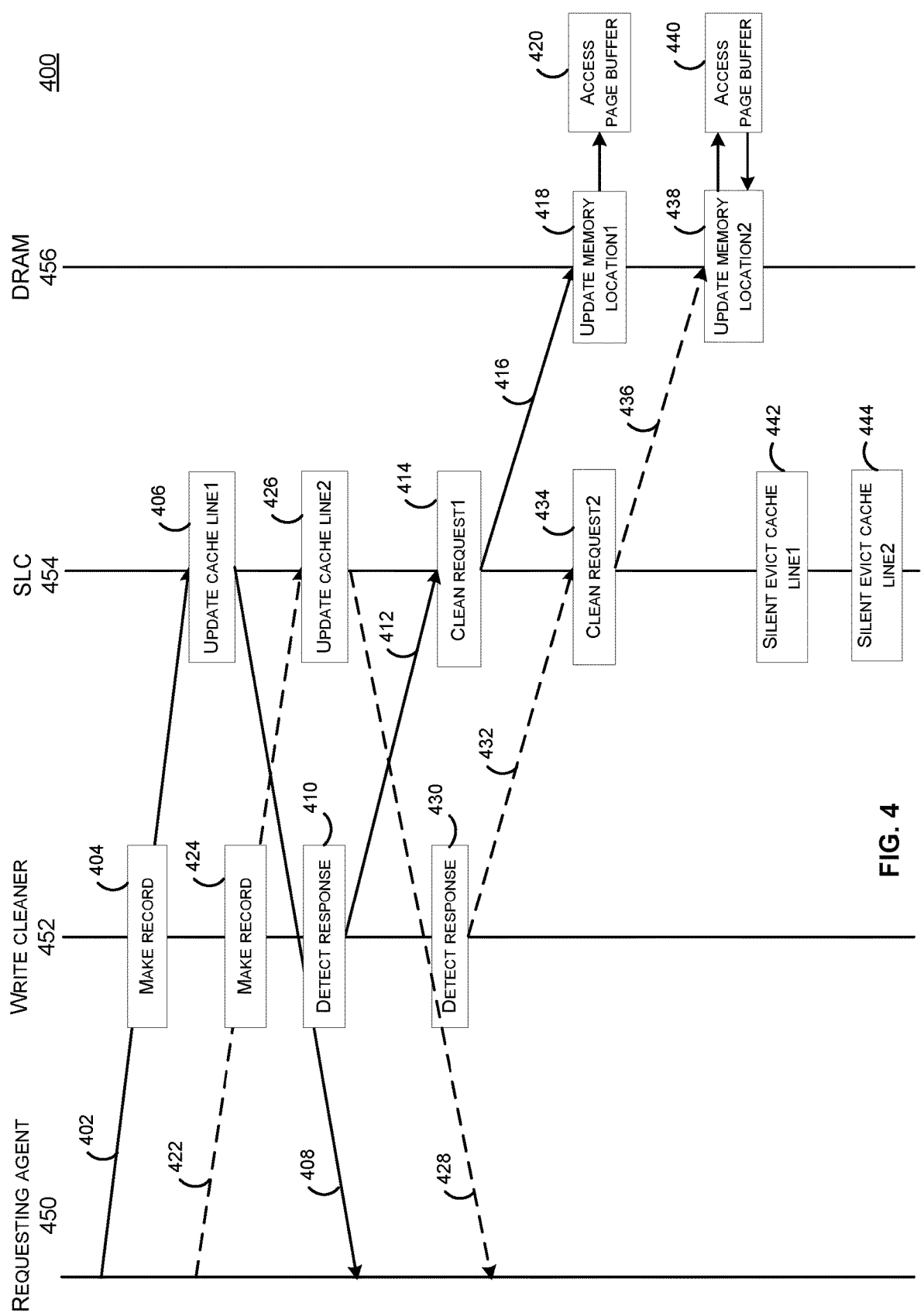
FIG. 4 illustrates a communication diagram to show the interactions among different components of a computing system to perform memory write transactions having sequential addresses using a write cleaner circuit, according to some embodiments.

FIG. 4 illustrates a communication diagram 400 to show the interactions among different components of a computing system to perform memory write transactions having sequential addresses using a write cleaner circuit, according to some embodiments. As discussed with reference to FIG. 3, a requesting agent 450 can be an example of the requesting agent 302, a write cleaner 452 can be an example of the write cleaner 308, an SLC 454 can be an example of the WB cache memory 304, and a DRAM 456 can be an example of the system memory 306 of the computing system 300 in FIG. 3.

In step 402, the requesting agent 450 may issue a first memory write transaction to write data into a first memory location corresponding to a transaction address. The first memory write transaction may include an address, a source identifier, a target identifier, a transaction identifier, read/write indication, and other suitable attributes. In some embodiments, the requesting agent 450 may mark the first memory write transaction to indicate that the first memory write transaction is part of a set of memory write transactions having sequential addresses. In some implementations, AXI USER bits can be used to mark a memory write transaction from the set of memory write transactions having sequential addresses.

In step 404, the write cleaner 452 may detect the first memory write transaction and determine that the first memory write transaction includes a sequential address that corresponds to a memory page in the DRAM 456. The write cleaner 452 may make a record of the first memory write transaction by saving the information (e.g., certain attributes) associated with the first memory write transaction. For example, the write cleaner 452 may save the transaction address, read/write indication, source identifier, target identifier, transaction identifier, and/or other suitable attributes of the first memory write transaction that can be used to generate a clean request associated with the first memory write transaction. The write cleaner 452 may identify the sequential address based on the indication in the first memory write transaction. In some embodiments, instead of identifying the sequential address based on the indication in the transaction, the write cleaner circuit 452 may compare the transaction address with an address range corresponding to the memory page, and may determine that the first memory write transaction includes a sequential address that corresponds to the same memory page if the transaction address lies within the address range.

In step 406, the first memory write transaction may be received by the SLC 454. The SLC 454 may update a cache line1 corresponding to the first memory location by writing the data for the first memory write transaction and changing the status of the cache line1 to dirty. For example, the cache line1 may have been allocated before the first memory write transaction (e.g., allocated in the cache from a previous transaction). Thus, performing the first memory write transaction by the SLC 454 may make the contents of the memory location in the SLC 454 and the DRAM 456 incoherent.

In step 408, the SLC 454 may send a first response to the requesting agent 450 indicating completion of the first memory write transaction or another type of acknowledgment in response to performing the first memory write transaction.

In step 410, the write cleaner 452 may detect the first response from the SLC 454, which may indicate that the SLC 454 has performed the first memory write transaction. In step 412, the write cleaner 452 may generate a first clean request to the SLC 454 based on the first memory write transaction. The first clean request may include an indication to clear the dirty bit and some of the same attributes as the first memory write transaction (e.g., transaction address, read/write indication, target identifier). In some examples, the first clean request may include a new source identifier, and a new transaction identifier indicating a cache clean transaction. As an example, if the interconnect fabric is based on the CHI or ACE protocol, the CleanShared transaction can be used for the first clean request to indicate a cache clean operation.

In step 414, the SLC 454 may receive the first clean request from the write cleaner 452. In response to the first clean request, the SLC 454 may request the DRAM 456 to update the first memory location by generating a first update request to the DRAM 456 in step 416, and update the status of the cache line1 from dirty to clean to clear the dirty bit. Thus, generating the first clean request using the write cleaner 452 can enable the SLC 454, which is a WB cache, to behave like a WT cache and force an update of the DRAM 456 without waiting for the cache line1 to evict at a later point in time.

In step 418, the DRAM 456 may receive the first update request to update the first memory location. In step 420, the DRAM 456 may access the page buffer to perform the first memory write operation. As discussed with reference to FIG. 2, the DRAM 456 may download the memory page corresponding to the first memory location into the page buffer and update the contents of the memory page with updated data from the SLC 454 for the first memory write transaction. The memory page may be held in the page buffer until another page needs to be downloaded into the page buffer for another memory transaction.

In step 422, the requesting agent 450 (or another requesting agent) may issue a second memory write transaction to write data into a second memory location corresponding to a transaction address that is sequential to the transaction address for the first memory write transaction. In some embodiments, the requesting agent 450 may mark the second memory write transaction to indicate that the second memory write transaction is part of a set of memory write transactions having sequential addresses. The second memory write transaction may also include an address, a source identifier, a target identifier, read/write indication, a transaction identifier, and other suitable attributes.

In step 424, the write cleaner 452 may detect the second memory write transaction and determine that the second memory write transaction includes a sequential address that corresponds to the same memory page in the DRAM 456 as the first memory write transaction. The write cleaner 452 may make a record of the second memory write transaction by saving the information associated with the second memory write transaction. For example, the write cleaner 452 may save the transaction address, read/write indication, target identifier, source identifier, transaction identifier, and/or other suitable attributes of the second memory write transaction that can be used to generate a clean request associated with the second memory write transaction. The write cleaner 452 may identify the sequential address based on the indication in the second memory write transaction or by comparing the transaction address with the address range corresponding to the memory page.

In step 426, the second memory write transaction may be received by the SLC 454. The SLC 454 may update the cache line2 corresponding to the second memory location by writing the data for the second memory write transaction and changing the status of the cache line2 to dirty. For example, the cache line2 may have been allocated before the second memory write transaction. Thus, performing the second memory write transaction by the SLC 454 may make the contents of the memory location in the SLC 454 and the DRAM 456 incoherent.

In step 428, the SLC 454 may send a second response to the requesting agent 450 indicating completion of the second memory write transaction or another type of acknowledgment in response to performing the second memory write transaction.

In step 430, the write cleaner 452 may detect the second response from the SLC 454, which may indicate that the SLC 454 has performed the second memory write transaction. In step 432, the write cleaner 452 may generate a second clean request to the SLC 454 based on the second memory write transaction. The second clean request may include an indication to clear the dirty bit and some of the same attributes as the second memory write transaction (e.g., transaction address, read/write indication, target identifier). In some examples, the second clean request may include a new source identifier, and a new transaction identifier indicating a cache clean transaction.

In step 434, in response to the second clean request, the SLC 454 may request the DRAM 456 to update the second memory location by generating a second update request to the DRAM 456 in step 436, and update the status of the cache line2 from dirty to clean to clear the dirty bit.

In step 438, the DRAM 456 may receive the second update request to update the second memory location. In step 440, the DRAM 456 may access the page buffer to perform the second memory write operation. Since the second memory write transaction includes the sequential address, the page buffer may already contain the contents of the memory page for the second memory write transaction and any other subsequent memory transactions that correspond to the same memory page that the DRAM 456 was operating on for the first memory write transaction. Thus, the memory page may not need to be uploaded to the DRAM 456 for each memory write transaction from the set of memory write transactions having sequential addresses. Hence, the number of uploads to the DRAM 456 can be drastically reduced for the memory transactions having sequential addresses, which can improve the performance of the DRAM 456.

In step 442, the SLC 454 may perform a silent eviction of the cache line1 to make room for another cache line. The silent eviction may not require an update request to the DRAM 456 since the dirty bit of the cache line1 has already been cleared and the contents at the memory location are coherent.

In step 444, the SLC 454 204 may perform a silent eviction of the cache line2 to make room for another cache line. Similarly, the silent eviction may not require an update request to the DRAM 456 since the dirty bit of the cache line2 has already been cleared.

Figure 5:
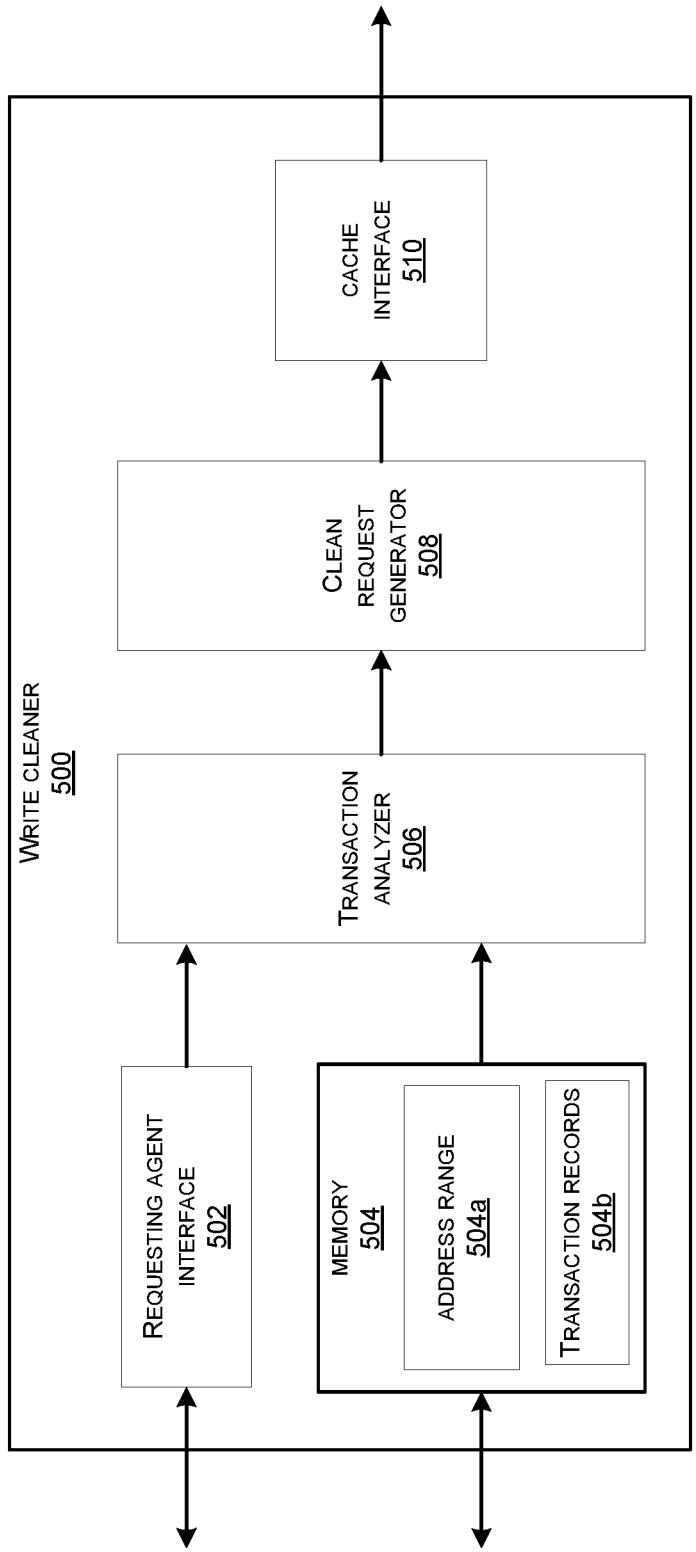
FIG. 5 illustrates an example block diagram for a write cleaner circuit, according to some embodiments.

FIG. 5 illustrates an example block diagram for a write cleaner 500, according to some embodiments. The write cleaner 500 can be an example of the write cleaner 308 in FIG. 3. The write cleaner 500 can be an integrated circuit implemented using registers, comparators, ports, buses, state machines, or other suitable circuits. The write cleaner 500 may include a requesting agent interface 502, a memory 504, a transaction analyzer 506, a clean request generator 508, and a cache interface 510. In various embodiments, one or more of the components of the write cleaner 500 can be separated as distinct components, or be integrated with a requesting agent.

The requesting agent interface 502 may be used to communicate with one or more requesting agents via an interconnect fabric. For example, the requesting agent interface 502 may be used to communicate with the requesting agent 202. In some embodiments, the requesting agent interface 502 may be used to intercept the memory transactions issued by the one or more requesting agents to the WB cache memory 304.

The memory 504 may be used to store an address range 504a, transaction records 504b, and any other useful information. The address range 504a can be used by the write cleaner 500 to identify whether a memory transaction is part of a set of memory transactions that have sequential addresses or belong to a port. The address range 504a can be programmed by the system software using a configuration interface. In some examples, the address range 504a may correspond to an address window associated with the system memory 306. In some embodiments, the memory 504 may also store a threshold which can be used to identify a long transaction. The transaction records 504b may store information associated with certain memory transactions issued by the requesting agents to the WB cache memory 304, which can be used to generate the clean requests.

The transaction analyzer 506 may be configured to analyze a transaction intercepted by the requesting agent interface 502 and determine whether a memory write transaction from the requesting agent 302 to access a memory location triggers a clean request. In some examples, the transaction analyzer 506 may include the decision circuitry configured to determine whether a memory write transaction from the requesting agent 302 to access a memory location triggers a clean request based on an indication in the memory write transaction. For example, the requesting agent 302 may mark a memory write transaction as a candidate for generating the clean request if the memory write transaction is part of a set of memory write transactions having sequential addresses. The memory write transaction may have been issued to access a memory location corresponding to a memory page in the system memory 306. In some embodiments, the decision circuitry may be configured to determine whether a long memory write transaction from the requesting agent 302 to access a set of memory locations triggers a clean request based on a comparison of the transaction size with a threshold. The long memory write transaction may have been issued to access the set of memory locations corresponding to the same memory page in the system memory 306.

In some embodiments, the transaction analyzer 506 may determine that a memory write transaction from the requesting agent 302 to access a memory location triggers a clean request based on a comparison of the transaction address with the address range 504a. The address range 504a can be associated with a set of sequential addresses, or one or more ports. If the transaction analyzer 506 determines that the memory write transaction is a candidate for generating the clean request, the information associated with the memory write transaction can be stored in the transaction records 504b. The transaction analyzer 506 may also be configured to detect a response from the WB cache memory 304, similar to the response described with reference to the steps 408 and 428 in FIG. 4.

The clean request generator 508 may include the generation circuitry configured to generate a clean request based on the transaction information stored in the transaction records 504b. The clean request may include an indication to clear the dirty bit and some of the transaction attributes such as a transaction address, read/write indication, and a target identifier based on the transaction records 504b. As an example, for the CHI or ACE protocol, the CleanShared transaction can be used for the clean request to indicate a cache clean operation for the WB cache memory 304.

The cache interface 510 may be used to communicate with the WB cache memory 304 via the interconnect fabric. For example, the write cleaner 510 may send the clean request to the WB cache memory 304 via the cache interface 510.

In different embodiments, one or more components of the write cleaner 500, e.g., the transaction analyzer 506, the clean request generator 508, the requesting agent interface 502 and the memory 504, can be distinct components or be integrated with other components in the computing system with appropriate interfaces to communicate with the corresponding requesting agent, port, interconnect fabric, and/or the WB cache memory 304.

Figure 6:
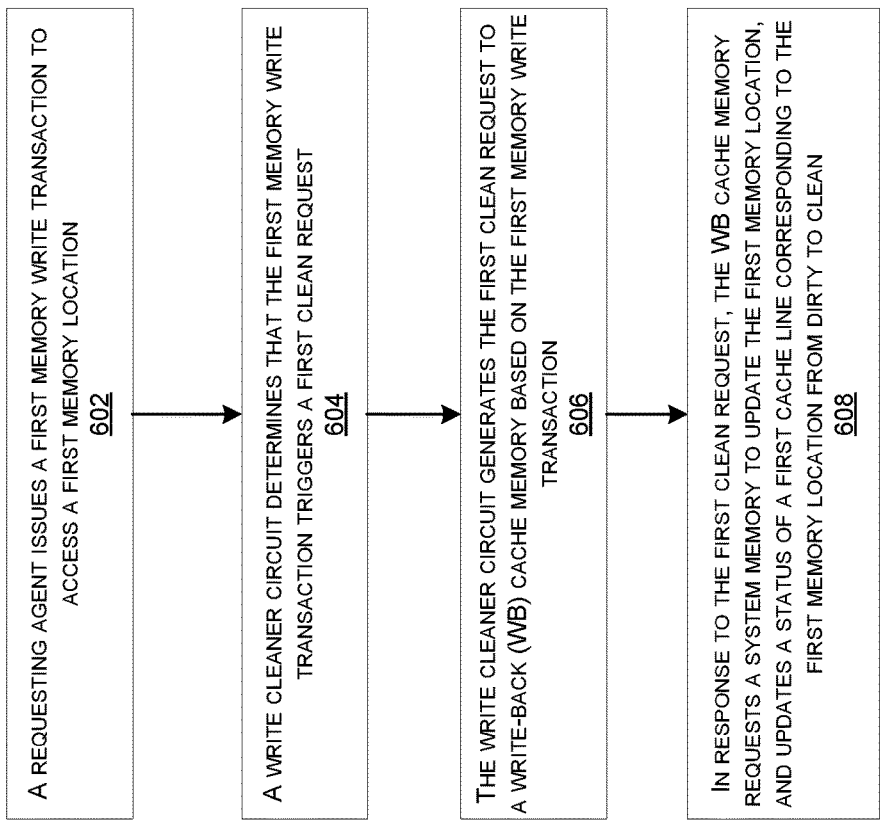
FIG. 6 illustrates a flow chart for a method performed by an IC device to generate clean requests using a WB cache memory, according to some embodiments.

FIG. 6 illustrates a flow chart 600 for a method performed by an IC device to generate clean requests using a WB cache memory, according to some embodiments. The IC device can be part of the computing system 300 described with reference to FIG. 3.

In step 602, the method includes issuing, by a requesting agent, a first memory write transaction to access a first memory location. The requesting agent can be the requesting agent 302, which issues a first memory write transaction to access a first memory location. As an example, the requesting agent can be a processor.

In step 604, the method includes determining, by a write cleaner circuit, that the first memory write transaction triggers a first clean request. The write cleaner circuit can be the write cleaner 308 or the write cleaner 500, which can determine that the first memory write transaction triggers a first clean request. The first memory transaction can be received by the write cleaner 308 using the requesting agent interface 502. The transaction analyzer 506 may analyze the first memory write transaction and determine that the first memory write transaction to access the first memory location triggers a first clean request based on an indication in the first memory write transaction. For example, the first memory write transaction may be part of a set of memory write transactions having sequential addresses, and may be marked by the requesting agent 302 for generating the first clean request. The transaction analyzer 506 may store the information associated with the first memory write transaction in the transaction records 504b.

In step 606, the method includes generating, by the write cleaner circuit, the first clean request to a write-back (WB) cache memory based on the first memory write transaction. The clean request generator 508 may generate the first clean request based on the transaction information stored in the transaction records 504b. The first clean request may include an indication to clear the dirty bit and some of the transaction attributes such as a transaction address, read/write indication, and a target identifier based on the transaction records 504b.

In step 608, the method includes in response to the first clean request, by the WB cache memory, requesting a system memory to update the first memory location, and updating a status of a first cache line corresponding to the first memory location from dirty to clean. The WB cache memory 304, in response to the first clean request, may request the system memory 306 to update the first memory location, and update the status of the cache line1 corresponding to the first memory location from dirty to clean. Updating of the first memory location in the system memory 306 may include downloading contents of a memory page corresponding to the first memory location in a page buffer associated with the system memory 306, and updating the contents of the memory page with updated data from the WB cache memory 304 for the first memory write transaction.

The method may be performed for each memory write transaction having a sequential address issued by the one or more requesting agents to access memory locations corresponding to the same memory page in the system memory 306. The system memory 306 may download the contents of the memory page to the page buffer once, and update the contents of the memory page for multiple memory locations in the WB cache memory 304 corresponding to the write transactions having the sequential addresses. When no additional memory write transactions are issued within a time period to access a memory location corresponding to the same memory page, the updated contents of the memory page can be written back to the system memory 306. Thus, for memory transactions having sequential addresses issued within a time period, a single upload of the contents of page buffer to the system memory 306 may suffice.

At a later point in time, each cache line corresponding to those memory write transactions can be evicted silently without causing an additional update of the respective memory location in the system memory 306. Thus, generating clean requests using the write cleaner 308 can allow controlling the updates of the memory locations in the system memory in a predictable order so that uploading of the updated contents of the page buffer to the system memory 306 can be minimized and memory bandwidth can be improved.

Figure 7:
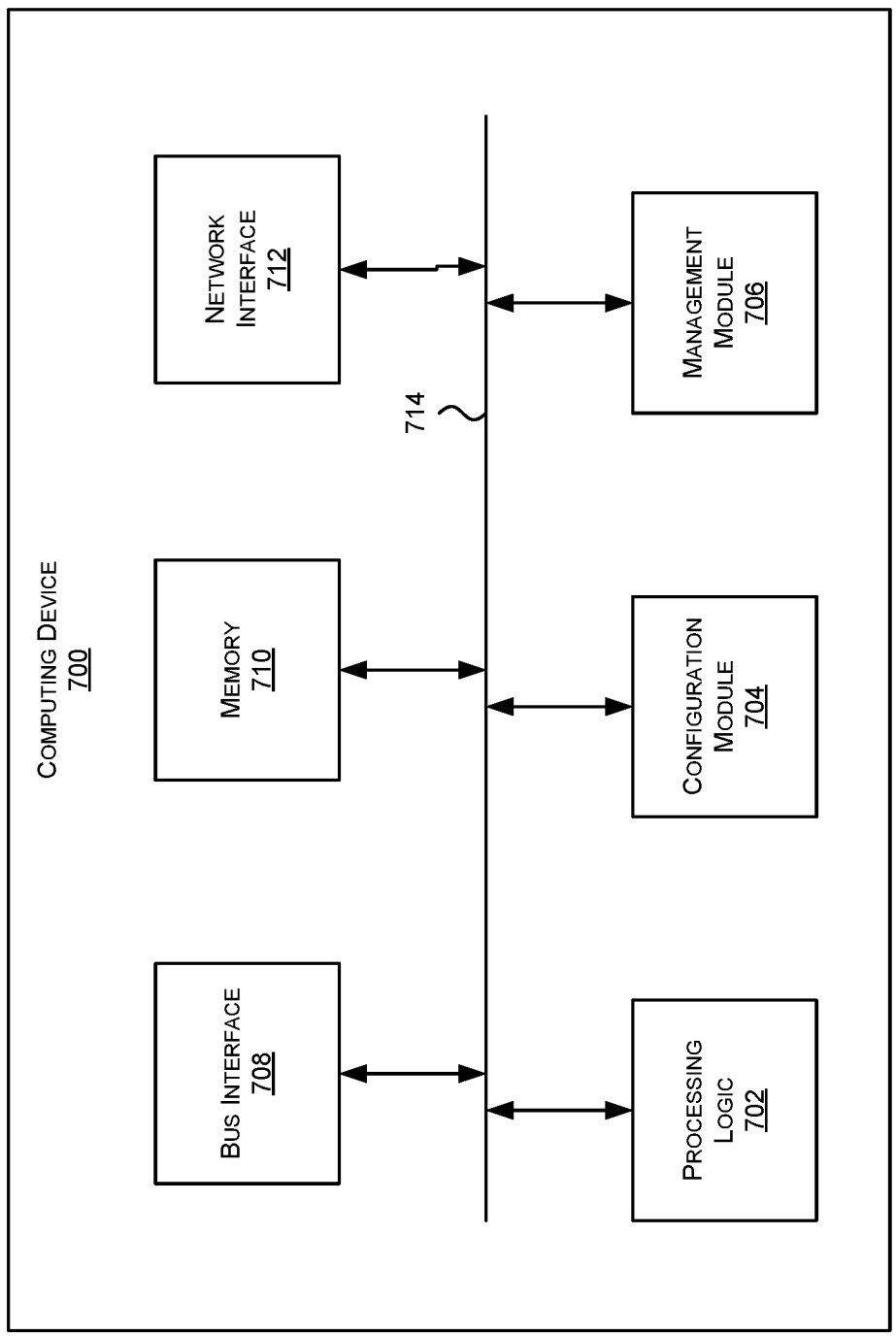
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. As an example, the computing device 700 can be part of the computing system 300. A computing device 700 may facilitate processing of packets and/or forwarding of packets from the computing device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 700 may be the recipient and/or generator of packets. In some implementations, the computing device 700 may modify the contents of the packet before forwarding the packet to another device. The computing device 700 may be a peripheral device coupled to another computer device, a switch, a router or any other suitable device enabled for receiving and forwarding packets.

In one example, the computing device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, which are not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory may also store and maintain several data structures and routing tables for facilitating the functionality of the computing device 700.

In some implementations, the configuration module 704 may include one or more configuration registers. Configuration registers may control the operations of the computing device 700. In some implementations, one or more bits in the configuration register can represent certain capabilities of the computing device 700. Configuration registers may be programmed by instructions executing in the processing logic 702, and/or by an external entity, such as a host device, an operating system executing on a host device, and/or a remote device. The configuration module 704 may further include hardware and/or software that control the operations of the computing device 700.

In some implementations, the management module 706 may be configured to manage different components of the computing device 700. In some cases, the management module 706 may configure one or more bits in one or more configuration registers at power up, to enable or disable certain capabilities of the computing device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
   a dynamic random access memory (DRAM);
   a plurality of requesting agents configured to issue memory write transactions;
   a system level cache (SLC) coupled to the plurality of requesting agents via an interconnect fabric, the SLC being a write-back cache memory; and
   a write cleaner circuit coupled to the interconnect fabric, the write cleaner circuit configured to:
      determine that memory write transactions having sequential addresses have been issued within a time period by one or more requesting agents from the plurality of requesting agents to access memory locations corresponding to a memory page in the DRAM; and
      generate a respective clean request to the SLC based on each of the memory write transactions corresponding to the memory page,
   wherein the SLC is configured to:
      perform each of the memory write transactions at a corresponding memory location in the SLC;
      receive the respective clean request for each of the memory write transactions from the write cleaner circuit;
      send respective update requests to the DRAM based on the respective clean requests; and
      update a status of a respective cache line corresponding to the respective memory location from dirty to clean based on the respective clean requests, and
   wherein the DRAM is configured to:
      receive the respective update requests for each of the memory write transactions from the SLC;
      download contents of the memory page corresponding to the sequential addresses once to a page buffer of the DRAM based on the respective update requests;
      update the contents of the memory page in the page buffer based on the corresponding memory locations in the SLC; and
      write the updated contents of the memory page from the page buffer back to the memory page in the DRAM.

2. The system of claim 1, wherein the write cleaner circuit determines that the memory write transactions having sequential addresses have been issued within the time period by the one or more requesting agents based on an indication in each of the memory write transactions.

3. The system of claim 1, wherein the write cleaner circuit determines that the memory write transactions having sequential addresses have been issued within the time period by the one or more requesting agents based on a comparison of each of the sequential addresses with a pre-defined address range.

4. The system of claim 1, wherein the DRAM writes the updated contents of the memory page back to the memory page in the DRAM after all the memory locations corresponding to the memory write transactions issued within the time period have been updated in the page buffer.

5. An integrated circuit (IC) device, comprising:
   a requesting agent configured to issue memory write transactions;
   a write-back (WB) cache memory coupled to the requesting agent via an interconnect fabric; and
   a write cleaner circuit coupled to the interconnect fabric, the write cleaner circuit configured to:
      determine that a memory write transaction from the requesting agent to access a memory location triggers a clean request; and
      generate the clean request to the WB cache memory based on the memory write transaction,
   wherein the WB cache memory is configured to, in response to receiving the clean request:
      request a system memory to update the memory location, and
      update a status of a cache line corresponding to the memory location from dirty to clean.

6. The IC device of claim 5, wherein the WB cache memory is further configured to silently evict the cache line with the clean status without causing another update of the memory location in the system memory.

7. The IC device of claim 5, wherein updating of the memory location in the system memory includes:

downloading contents of a memory page corresponding to the memory location in a page buffer associated with the system memory;

updating the contents of the memory page with updated data from the WB cache memory for the memory write transaction; and writing the updated contents of the memory page back to the system memory.

8. The IC device of claim 5, wherein the write cleaner circuit generates respective clean requests to the WB cache memory based on a corresponding memory write transaction from a set of memory write transactions having sequential addresses, wherein the set of memory write transactions are issued within a time period to access respective memory locations corresponding to a memory page in the system memory.

9. The IC device of claim 8, wherein the WB cache memory updates a status of each cache line corresponding to the respective memory locations from dirty to clean based on the respective clean requests.

10. The IC device of claim 9, wherein updating of the respective memory locations in the memory page includes:
downloading contents of the memory page corresponding to the sequential addresses into a page buffer associated with the system memory;
updating the contents of the memory page in the page buffer based on updated data from the WB cache memory for each corresponding memory write transaction; and
writing the updated contents of the memory page back to the system memory.

11. The IC device of claim 8, wherein the write cleaner circuit determines that the set of memory write transactions are issued within the time period to access the respective memory locations corresponding to the memory page based on an indication in each of the memory write transactions in the set of memory write transactions.

12. The IC device of claim 8, wherein the write cleaner circuit determines that the set of memory write transactions are issued within the time period to access the respective memory locations corresponding to the memory page based on a comparison of each address of the sequential addresses with an address range.

13. The IC device of claim 5, wherein the clean request includes same address and cache attributes as the memory write transaction.

14. The IC device of claim 5, wherein the requesting agent is a processor, the system memory is a DRAM, and the WB cache memory is a system level cache (SLC) coupled to other processors via the interconnect fabric.

15. A method performed by an integrated circuit (IC) device, comprising:
issuing, by a requesting agent, a first memory write transaction to access a first memory location;
determining, by a write cleaner circuit, that the first memory write transaction triggers a first clean request, the write cleaner circuit coupled to the requesting agent;
generating, by the write cleaner circuit, the first clean request to a write-back (WB) cache memory based on the first memory write transaction, the WB cache memory coupled to an interconnect fabric; and
in response to the first clean request, by the WB cache memory:
requesting a system memory to update the first memory location; and
updating a status of a first cache line corresponding to the first memory location from dirty to clean.

16. The method of claim 15, wherein updating of the first memory location in the system memory includes:
downloading contents of a memory page corresponding to the first memory location into a page buffer associated with the system memory; and
updating the contents of the memory page based on the first memory location in the WB cache memory.

17. The method of claim 16, further comprising:
issuing, by the requesting agent, a second memory write transaction to access a second memory location, wherein the second memory location also corresponds to the memory page in the system memory;
determining, by the write cleaner circuit, that the second memory write transaction triggers a second clean request based on the second memory location corresponding to the memory page in the system memory; and
generating, by the write cleaner circuit, the second clean request to the WB cache memory for a second cache line based on the second memory write transaction.

18. The method of claim 17, wherein updating of the second memory location in the system memory includes:
updating the contents of the memory page in the page buffer based on the second memory location in the WB cache memory.

19. The method of claim 18, wherein the updated contents of the memory page in the page buffer are written back to the system memory when no additional memory write transactions are issued within a time period to access a memory location corresponding to the memory page.

20. The method of claim 17, further comprising:
evicting, by the WB cache memory, the first cache line silently without causing an additional update of the first memory location in the system memory; and
evicting, by the WB cache memory, the second cache line silently without causing an additional update of the second memory location in the system memory.

* * * * *